United States Patent
Mammen et al.

(10) Patent No.: US 7,909,171 B2
(45) Date of Patent: Mar. 22, 2011

(54) SINGLE VANE SLAT

(75) Inventors: David W. Mammen, Mendota, IL (US);
Brandon J. Marquardt, Oregon, IL (US)

(73) Assignee: HCC, Inc.IL (US)

( * ) Notice: Subject to any disclaimer, the term of this patent is extended or adjusted under 35 U.S.C. 154(b) by 310 days.

(21) Appl. No.: 11/832,723

(22) Filed: Aug. 2, 2007

(65) Prior Publication Data
US 2008/0029443 A1 Feb. 7, 2008

Related U.S. Application Data

(60) Provisional application No. 60/821,289, filed on Aug. 3, 2006.

(51) Int. Cl.
*B07B 1/49* (2006.01)
(52) U.S. Cl. ........ 209/394; 209/393; 209/395; 209/396; 460/101
(58) Field of Classification Search .......... 209/393–396; 460/101
See application file for complete search history.

(56) References Cited

U.S. PATENT DOCUMENTS

| | | | | |
|---|---|---|---|---|
| 1,448,725 | A * | 3/1923 | Campbell | 209/393 |
| 2,058,381 | A * | 10/1936 | Lindgren | 209/394 |
| 2,253,296 | A * | 8/1941 | Holtzman | 209/394 |
| 2,335,416 | A * | 11/1943 | Holtzman | 209/394 |
| 2,883,052 | A * | 4/1959 | Shovlain | 209/394 |
| 4,283,278 | A * | 8/1981 | Savage et al. | 209/395 |
| 4,457,434 | A * | 7/1984 | Brown et al. | 209/539 |
| 4,505,812 | A * | 3/1985 | Lees | 209/275 |
| 4,511,466 | A | 4/1985 | Jones et al. | |
| 4,791,036 | A * | 12/1988 | Schrenk et al. | 429/178 |
| 5,462,174 | A * | 10/1995 | Truckenbrod et al. | 209/394 |
| 5,489,029 | A * | 2/1996 | Jonckheere et al. | 209/676 |
| 5,603,853 | A * | 2/1997 | Mombo-Caristan | 219/121.64 |

* cited by examiner

*Primary Examiner* — Stefanos Karmis
*Assistant Examiner* — Prasad V Gokhale
(74) *Attorney, Agent, or Firm* — Clark Hill PLC

(57) ABSTRACT

A single vane slat design for use in a sieve or chaffer of a harvester combine. The single vane slat has a weld pocket, preferably on its bottom surface, for receiving a wire on a frame. The single vane slat may be formed of a 26 gage material, and may be attached to the wire using two small welds. The weld material is configured to flow into the weld pocket upon being welded, and achieve direct and incidental contact between the wire and the slat. The weld pocket of the slat is configured such that the slat is self-fixturing to the wire, which lends to the ability to weld the slats to the wires while fixed in the frame. This facilitates accommodating a large number of frame types and sizes.

24 Claims, 4 Drawing Sheets

SINGLE VANE SLAT

RELATED APPLICATION

Priority Claim

This application claims the benefit of U.S. Provisional Application Ser. No. 60/821,289, filed Aug. 3, 2006, which is hereby incorporated herein by reference in its entirety.

BACKGROUND

The present invention generally relates to sieves and chaffers which are part of a combine harvester, and more specifically relates to a single vane slat as used in such a sieve or chaffer.

Sieves and chaffers for harvester combines typically have slats (i.e., louvers) spot-welded to wires. Prior art designs are disclosed in U.S. Pat. Nos. 2,253,296 and 4,511,466. Both of these disclosures are hereby incorporated herein by reference in their entirety.

The fact that the slats are spot-welded to the wires presents several disadvantages. For example, in order to achieve a good spot-weld, the spot-welding process needs to be performed as part of a sub-assembly process. In addition, if a single vane slat is used, a heavy slat thickness must be used to insure a good weld joint. In order to use a thinner slat, a current design in the industry provides that a double vane snaps onto a wire and is then spot-welded from both sides, sandwiching the wire between the vanes. This requires the use of an excessive amount of vane material and is time-consuming.

OBJECT AND SUMMARY

An object of an embodiment of the present invention is to provide an improved single vane slat design for use in a sieve or chaffer of a harvester combine.

Briefly, and in accordance with at least one of the foregoing objects, a preferred embodiment of the present invention provides a single vane slat design for use in a sieve or chaffer of a harvester combine. The single vane slat has a weld pocket, preferably on its bottom surface, for receiving a wire. The single vane slat may be formed of a 26 gage material, and may be attached to the wire using two small welds. The weld material is configured to flow into the weld pocket upon being welded, and achieve direct and incidental contact between the wire and the slat. The weld pocket of the slat is configured such that the slat is self-fixturing to the wire, which lends to the ability to weld the slats to the wires while fixed in the frame. This facilitates accommodating a large number of frame types and sizes.

Another embodiment of the present invention provides a method of forming a sieve or chaffer for use in a harvester combine. A frame is provided wherein the frame has walls and wires extending between the walls. Single vane slats are engaged with the wires such that the wires are received in weld pockets which are provided on the slats, preferably on lower surfaces of the slats. A flowable material is used to achieve direct and incidental contact between the wire and the slat, thereby connecting the slats to the wires. The slats may be made of 26 gage steel sheet metal material.

Still another embodiment of the present invention is a sieve or chaffer for use in a harvester combine. The sieve consists of a frame that has walls and wires extending between the walls. Single vane slats are engaged with the wires. Specifically, the wires are received in weld pockets of the slats, preferably on lower surfaces of the slats. A flowable material is in the weld pockets and is in contact with both the wires and the slats, thereby providing that the slats are connected to the wires.

BRIEF DESCRIPTION OF THE DRAWINGS

The organization and manner of the structure and operation of the invention, together with further objects and advantages thereof, may best be understood by reference to the following description, taken in connection with the accompanying drawing, wherein.

DESCRIPTION

Figure 1:
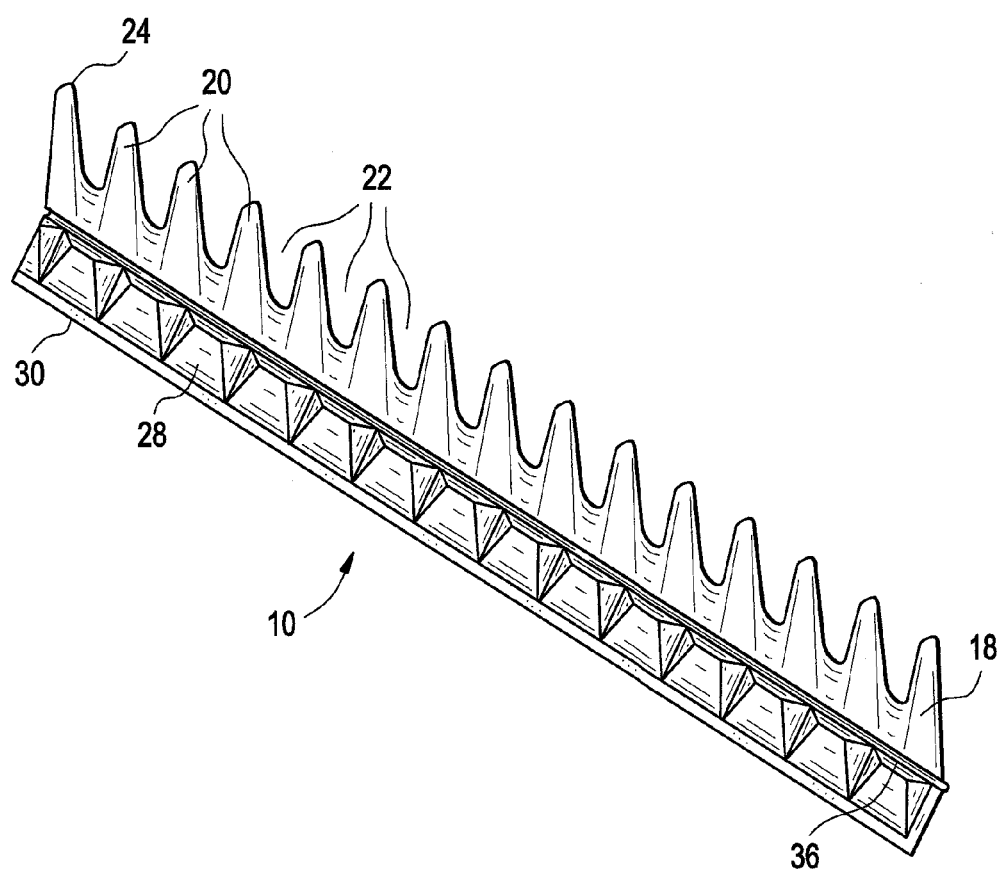
FIG. 1 is a perspective view of a single vane slat which is in accordance with an embodiment of the present invention.

While the invention may be susceptible to embodiment in different forms, there are shown in the drawings, and herein will be described in detail, specific embodiments of the present invention. The present disclosure is to be considered an example of the principles of the invention, and is not intended to limit the invention to that which is illustrated and described herein.

An embodiment of the present invention provides a single vane slat design which provides that a weld material is used to secure the single vane slat to a wire such that there is less heat distortion. As such, a thinner material can be used for the single vane slat and only two small welds need be used to secure the single vane slat to a wire.

Figure 2:
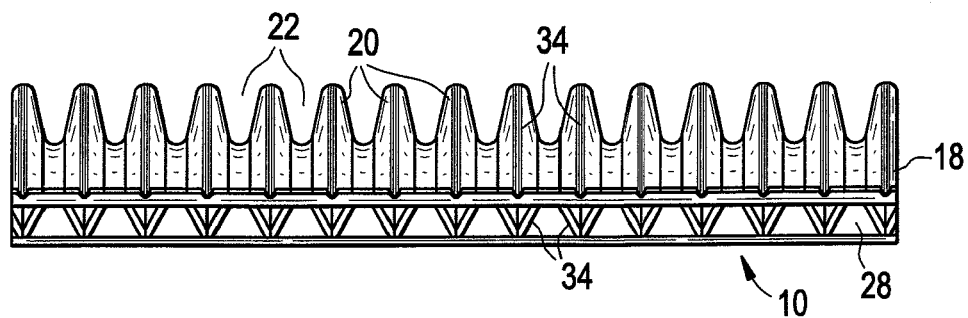
FIG. 2 is top view of the single vane slat shown in FIG. 1.

FIG. 1 is a perspective view of a single vane slat 10 which is in accordance with an embodiment of the present invention. FIG. 2 provides a top view of the slat 10, and FIG. 3 provides a side view, showing a plurality of slats 10 secured to wires 12 of a frame 14 of a sieve or chaffer 16 for a harvester combine.

As shown in FIGS. 1 and 2, the slat 10 consists of for example, sheet metal 18 and consists of a plurality of fingers 20 between which are sieve and mesh openings 22 for passage of grain to a pan, not shown, extending the length and width of the chaffer 16. In operation, with reference to FIG. 3, the chaff and grain flow is from right to left along a top 24 of the slat 10, as depicted by arrow 26. As shown in FIGS. 1-3, the slat 10 also includes an air blast baffle portion 28. In operation, with reference to FIG. 3, the air flow is form right to left along a bottom 30 of the slat 10, as depicted by arrow 32. Both the air blast baffle portion 28 and the fingers 20 have reinforcing ribs 34 formed thereon.

Figure 3:
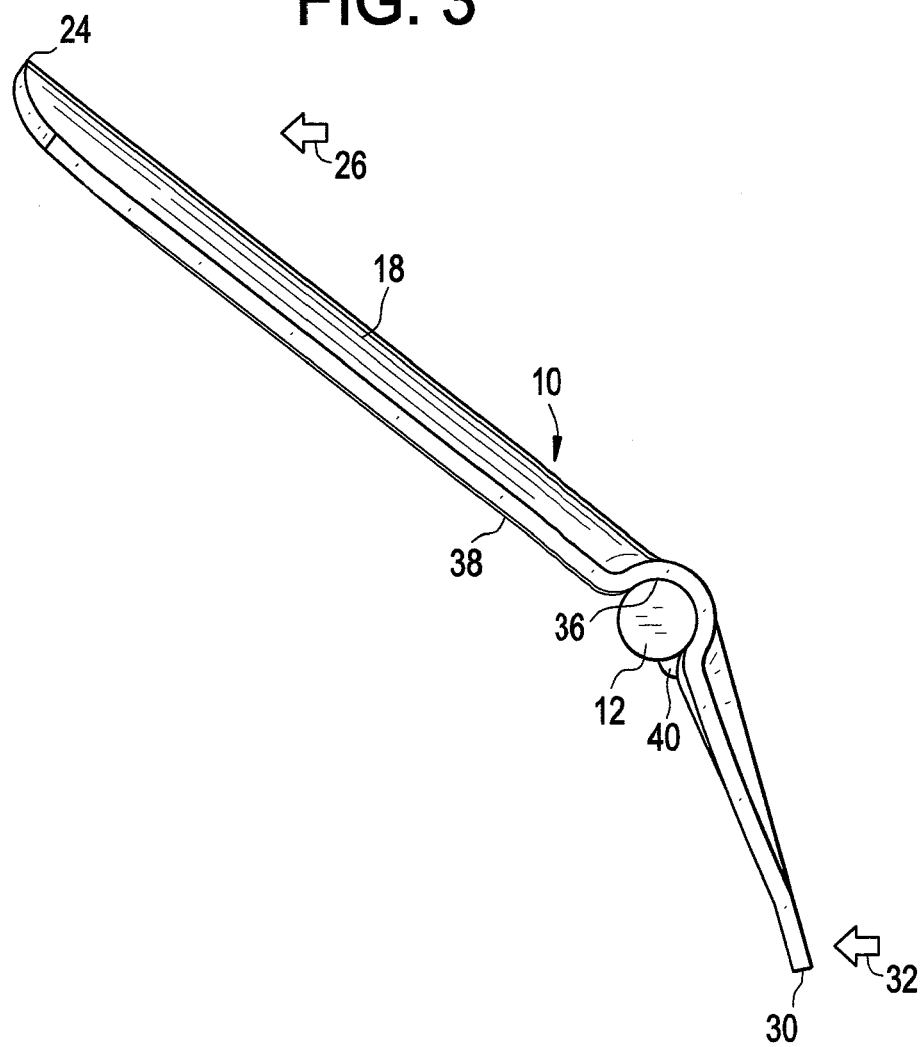
FIG. 3 is a side view of the slat, showing the slat secured to a wire.

As shown in FIGS. 1-3, the slat 10 also includes a weld pocket 36, preferably on its bottom surface 38, for receiving a wire 12. Specifically, the weld pocket 36 provides that the slat 10 can be engaged with the wire 12, and then a weld material 40 such as silicone bronze, is used to connect the slat 10 to the wire 12. The weld material 40 is configured to flow into the weld pocket 36 upon being MIG welded, and achieves direct and incidental contact between the wire 12 and the slat 10. Preferably, two welds are used per slat 10; however, more or less weld spots can be used. The weld pocket 36 of the slat 10 is configured such that the slat 10 is self-fixturing on the wire 12, which lends to the ability to weld the slats 10 to the wires 12 while fixed in the frame 14. This facilitates being able to accommodate a large number of frame types and sizes.

The fact that a MIG weldable weld material 40 such as silicone bronze is used to permanently affix the slat 10 to the wire 12 provides that lower heat can be applied to effect the weld. As such, not much heat distortion is caused, and a thinner material can be used for the single vane slat 10. For example, 26 gage sheet metal material 18 can be used. Additionally, only two small welds can be used to effect the attachment. The fact that the slat 10 includes a weld pocket 36 provides that weld material 40 flows into the joint and achieves direct and incidental contact between the wire 12 and the slat 10, within the weld pocket 36.

Figure 4:
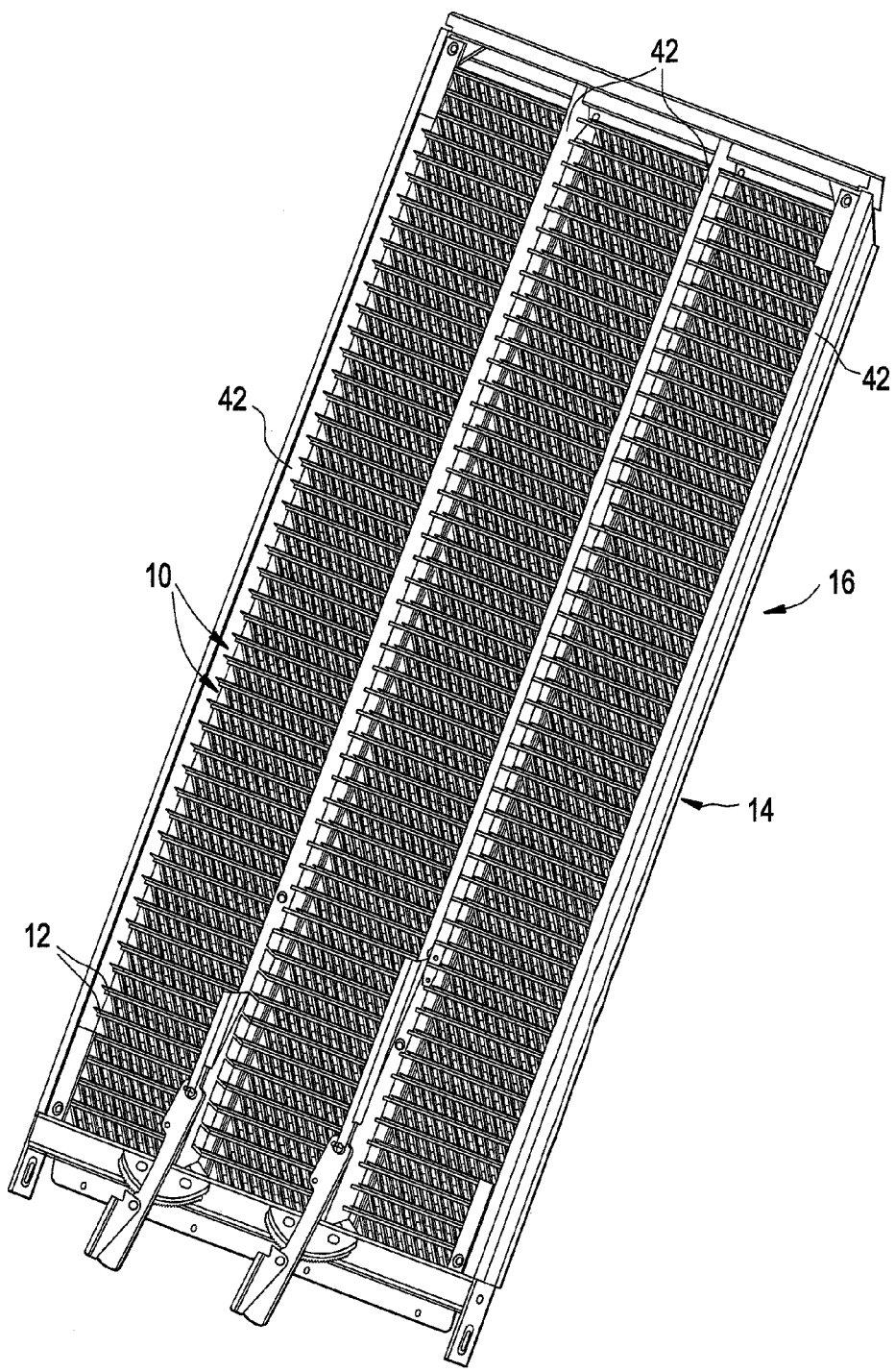
FIG. 4 is a perspective view of a sieve or chaffer for a combine harvester, where the sieve includes single vane slats such as is shown in the previous figures.

FIG. 4 illustrates a sieve or chaffer 16 which includes a plurality of such single vane slats 10, where the sieve or chaffer 16 is in accordance with an embodiment of the present invention. As shown, the sieve 16 consists of a frame 14 that has parallel walls 42 and wires 12 which extend between the walls 42. The single vane slats 10 are engaged with the wires 12, as described above with regard to FIG. 3. Specifically, the wires 12 are received in weld pockets 36 of the slats 10, preferably on a bottom surface 38 of the slats 10. A flowable material 40, such as silicone bronze, is in the weld pockets 36 and is in contact with both the wires 12 and the slats 10, thereby providing that the slats 10 are connected to the wires 12.

Figure 5:
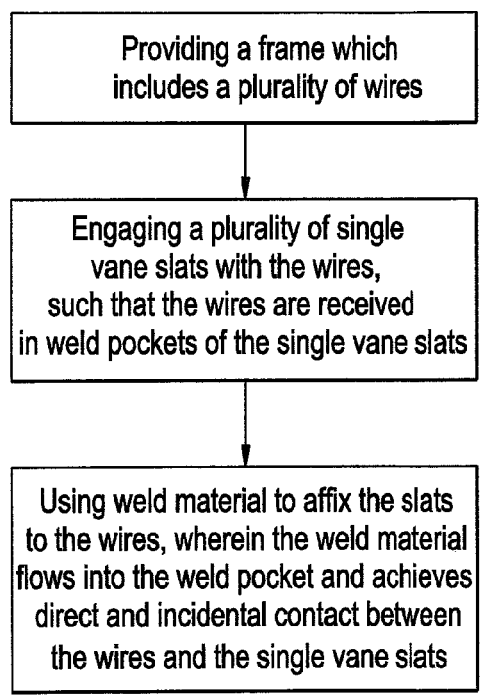
FIG. 5 is a block diagram of a method of forming a sieve or chaffer for a harvester combine, where the method is in accordance with an embodiment of the present invention.

FIG. 5 illustrates, in block diagram form, a method of making such a sieve or chaffer 16, where the method is in accordance with an embodiment of the present invention, and is self-explanatory.

While embodiments of the present invention are shown and described, it is envisioned that those skilled in the art may devise various modifications of the present invention without departing from the spirit and scope of the foregoing disclosure.

What is claimed is:

1. A sieve of a harvester combine comprising a plurality of single vane slats affixed to wires, wherein each single vane slat comprises a plurality of fingers, an air blast baffle portion which is opposite the fingers, a weld pocket on the slat, and weld material which is contained in the weld pocket and which is in contact with the slat and the wire, thereby providing that the slat is affixed to the wire, wherein no portion of any one of the single vane slats overlaps itself.

2. The sieve as recited in claim 1, wherein said weld material is separate from, and not formed from, both the slats and the wires.

3. A method of forming a sieve for use in a harvester combine, said method comprising:
providing a frame which includes a plurality of wires;
engaging a plurality of single vane slats with the wires, such that the wires are received in weld pockets of the single vane slats, wherein no portion of one of the single vane slats overlaps itself;
using weld material to affix the slats to the wires; and
causing the weld material to flow into the weld pocket in order to achieve direct and incidental contact between the wire and the single vane slat.

4. The method as recited in claim 3, wherein said weld material is separate from, and not formed from, both the slats and the wires.

5. A method of forming a sieve for use in a harvester combine, said method comprising:
providing a frame which includes a plurality of wires;
engaging a plurality of single vane slats with the wires, such that the wires are received in weld pockets of the single vane slats;
using weld material to affix the slats to the wires; and
causing the weld material to flow into the weld pocket in order to achieve direct and incidental contact between the wire and the single vane slat,
wherein prior to the slats being affixed to the wires, said wires are capable of being disengaged from the plurality of single vane slats upon both longitudinal and transverse movement of the wires relative to the plurality of single vane slats.

6. The method as recited in claim 5, wherein said weld material is separate from, and not formed from, both the slats and the wires.

7. A method of forming a sieve for use in a harvester combine, said method comprising:
providing a frame which includes a plurality of wires;
engaging a plurality of single vane slats with the wires, such that the wires are received in weld pockets of the single vane slats;
providing that the weld pockets of the single vane slats are provided on bottom surfaces of the single vane slats;
using weld material to affix the slats to the wires; and
causing the weld material to flow into the weld pocket in order to achieve direct and incidental contact between the wire and the single vane slat, wherein prior to the slats being affixed to the wires, the wires are capable of being disengaged from the plurality of single vane slats upon transverse movement of the wires away from the bottom surface of the plurality of single vane slats.

8. The method as recited in claim 7, wherein said weld material is separate from, and not formed from, both the slats and the wires.

9. A sieve of a harvester combine comprising a plurality of single vane slats affixed to wires, wherein each single vane slat comprises a plurality of fingers, an air blast baffle portion which is opposite the fingers, a weld pocket on the slat, and weld material which is contained in the weld pocket and which is in contact with the slat and the wire, thereby providing that the slat is affixed to the wire, wherein the single vane slats do not overlap themselves in order to assist in the affixment of the slats to the wires.

10. The sieve as recited in claim 9, wherein the weld pockets of the single vane slats are provided on bottom surfaces of the single vane slats.

11. The sieve as recited in claim 9, wherein the single vane slats are formed of 26 gage sheet metal.

12. The sieve as recited in claim 9, wherein the weld material comprises silicon bronze.

13. The sieve as recited in claim 9, wherein the weld material comes into contact with the slat and the wire by MIG welding.

14. The sieve as recited in claim 9, wherein the weld pocket is generally semi-circular and is formed at a connection of the plurality of fingers to the air blast baffle portion.

15. The sieve as recited in claim 9, wherein the weld pocket is self-fixturing to the wire.

16. The sieve as recited in claim 9, wherein said weld material is separate from, and not formed from, both the slats and the wires.

17. A method of forming a sieve for use in a harvester combine, said method comprising:
providing a frame which includes a plurality of wires;
engaging a plurality of single vane slats with the wires, such that the wires are received in weld pockets of the single vane slats;

using weld material to affix the slats to the wires; and causing the weld material to flow into the weld pocket in order to achieve direct and incidental contact between the wire and the single vane slat, wherein the single vane slats do not overlap themselves in order to assist in the affixment of the slats to the wires.

18. The method as recited in claim 17, further comprising providing that the weld pockets of the single vane slats are provided on bottom surfaces of the single vane slats.

19. The method as recited in claim 17, further comprising providing that the single vane slats are formed of 26 gage sheet metal.

20. The method as recited in claim 17, further comprising using silicon bronze as the weld material.

21. The method as recited in claim 17, wherein the step of causing the weld material to flow into the weld pocket in order to achieve direct and incidental contact between the wire and the single vane slat is performed by MIG welding.

22. The method as recited in claim 17, wherein each single vane slat is comprised of a plurality of fingers, an air blast baffle portion which is opposite the fingers, and a weld pocket that is formed at a connection of the plurality of fingers to the air blast baffle portion, the weld pocket being generally semi-circular in configuration.

23. The method as recited in claim 17, wherein the weld pockets of the slats are configured such that the slats are self-fixturing to the wires.

24. The method as recited in claim 17, wherein said weld material is separate from, and not formed from, both the slats and the wires.

* * * * *

UNITED STATES PATENT AND TRADEMARK OFFICE
CERTIFICATE OF CORRECTION

| | | |
|---|---|---|
| PATENT NO. | : 7,909,171 B2 | Page 1 of 1 |
| APPLICATION NO. | : 11/832723 | |
| DATED | : March 22, 2011 | |
| INVENTOR(S) | : David W. Mammen and Brandon J. Marquardt | |

It is certified that error appears in the above-identified patent and that said Letters Patent is hereby corrected as shown below:

Column 2, Line 60 "40 such as silicone bronze," should be -- 40 such as silicon bronze, --

Column 3, Line 4-5 "40 such as silicone bronze," should be -- 40 such as silicon bronze, --

Column 3, Line 25 "40, such as silicone bronze," should be -- 40, such as silicon bronze, --

Signed and Sealed this
Twenty-second Day of November, 2011

David J. Kappos
*Director of the United States Patent and Trademark Office*